United States Patent
Zhang et al.

(10) Patent No.: US 8,083,197 B2
(45) Date of Patent: Dec. 27, 2011

(54) MOUNTING APPARATUS FOR DATA STORAGE DEVICE

(75) Inventors: Guang-Yi Zhang, Shenzhen (CN); Zhe Zhang, Shenzhen (CN); Jian Fu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 211 days.

(21) Appl. No.: 12/543,510

(22) Filed: Aug. 19, 2009

(65) Prior Publication Data

US 2010/0294902 A1 Nov. 25, 2010

(30) Foreign Application Priority Data

May 19, 2009 (CN) .......................... 2009 1 0302433

(51) Int. Cl.
*A47F 5/00* (2006.01)
(52) U.S. Cl. ................. 248/309.1; 248/27.3; 248/224.8; 312/223.2; 361/679.23; 361/726
(58) Field of Classification Search ............... 248/27.3, 248/217.4, 224.8; 312/223.2, 333; 361/679.31, 361/679.58, 727, 818, 679.39, 726, 679.33
See application file for complete search history.

(56) References Cited

U.S. PATENT DOCUMENTS

| | | | | |
|---|---|---|---|---|
| 4,030,601 A * | 6/1977 | Ackeret | .................... | 206/387.12 |
| 5,262,923 A * | 11/1993 | Batta et al. | .............. | 361/679.37 |
| 5,752,329 A * | 5/1998 | Horibata | ............................ | 36/27 |
| 6,343,009 B1 * | 1/2002 | Liu et al. | ................... | 361/679.31 |
| 6,370,022 B1 * | 4/2002 | Hooper et al. | ........... | 361/679.33 |
| 6,398,041 B1 * | 6/2002 | Abbott | ............................. | 211/26 |
| 6,609,619 B2 * | 8/2003 | Abbott | ............................. | 211/26 |
| 6,671,180 B2 * | 12/2003 | Le et al. | ......................... | 361/726 |
| 6,826,045 B2 * | 11/2004 | Chen | ......................... | 361/679.33 |
| 6,883,884 B2 * | 4/2005 | Chen et al. | ..................... | 312/333 |
| 6,980,429 B2 * | 12/2005 | Ericks et al. | ............. | 361/679.32 |
| 7,072,177 B2 * | 7/2006 | Peng et al. | ............... | 361/679.33 |
| 7,108,340 B2 * | 9/2006 | Lai | ......................... | 312/334.46 |
| 7,542,280 B2 * | 6/2009 | Hong et al. | ............... | 361/679.33 |
| 7,580,253 B1 * | 8/2009 | Chen et al. | ............... | 361/679.33 |
| 7,604,308 B2 * | 10/2009 | Tseng et al. | ................... | 312/333 |
| 7,609,508 B2 * | 10/2009 | Chen et al. | ............... | 361/679.33 |
| 7,663,873 B2 * | 2/2010 | Lau | ......................... | 361/679.39 |

* cited by examiner

*Primary Examiner* — Terrell McKinnon
*Assistant Examiner* — Daniel J Breslin
(74) *Attorney, Agent, or Firm* — Altis Law Group, Inc.

(57) ABSTRACT

A mounting apparatus is provided for mounting a data storage device. The mounting apparatus includes a bracket to receive the data storage device, and a holder attached to bracket. The holder abuts against the front end of the data storage device, thereby retaining the data storage device in the bracket.

10 Claims, 4 Drawing Sheets

MOUNTING APPARATUS FOR DATA STORAGE DEVICE

BACKGROUND

1. Technical Field

The present disclosure relates to mounting apparatuses, and more particularly to a mounting apparatus readily installing or removing a data storage device to or from an electronic device.

2. Description of Related Art

An electronic apparatus, such as a computer, or a server, usually includes data storage devices, such as hard disk drives, compact disk read-only memory (CD-ROM) drives, digital video disc (DVD) drives, and floppy disk drives, to increase the functionality of the electronic apparatus. However, installation of such devices in the electronic apparatus is usually labor-intensive.

The installation of a hard disk drive in a computer generally involves using screws to attach the hard disk drive to a bracket in a chassis of the computer. Usually, these screws are so small that it is difficult to install them. Guiding and mounting the screws into intended locations is not easy, and it is time consuming. Additionally, because of their small sizes, the screws tend to drop before they are aligned at the intended locations, which may cause damages to the circuitry of the computer.

To solve the aforementioned problems, a number of types of mounting apparatuses have been invented to reduce the number of screws needed. For example, a pair of detachable rails is attached to opposite sides of a data storage device with screws, and the data storage device is thus slid into, and secured to a drive bracket. However, the screws have to be removed to detach the rails from the data storage device when replacing the data storage device.

DETAILED DESCRIPTION

Figure 1:
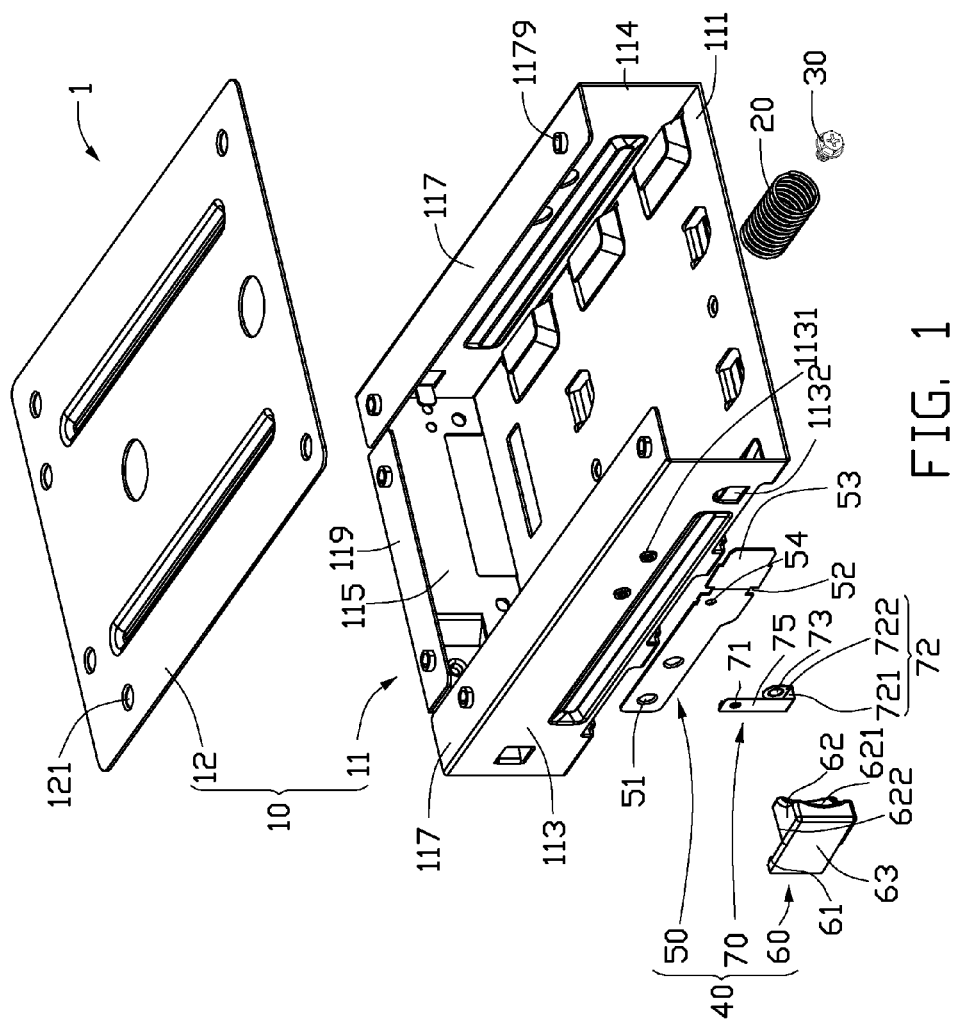
FIG. 1 is an exploded, isometric view of an embodiment of a mounting apparatus for a data storage device, the mounting apparatus includes a holder and a bracket.
Figure 2:
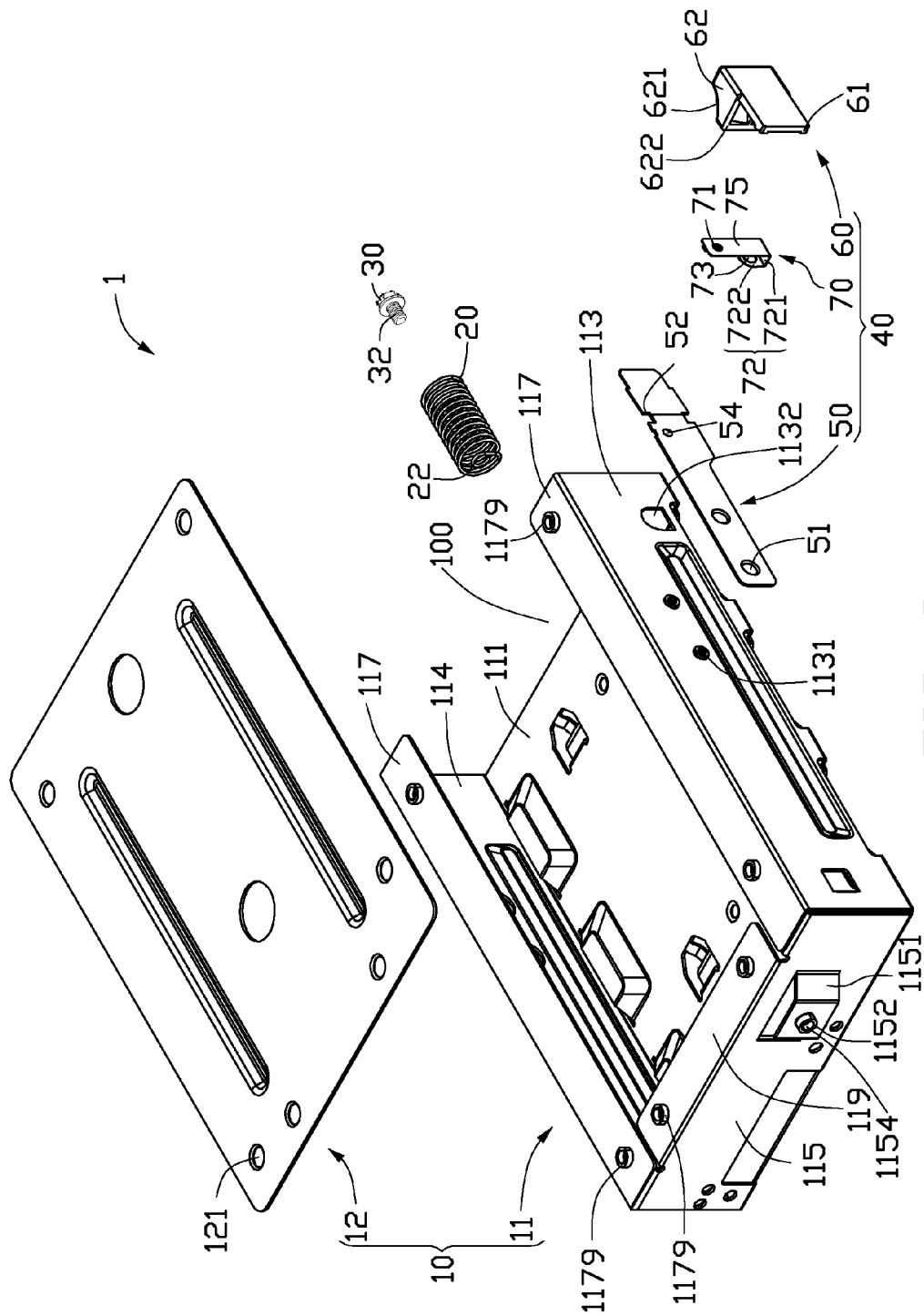
FIG. 2 is similar to FIG. 1, but viewed from another perspective.

Referring to FIGS. 1 and 2, an exemplary embodiment of a mounting apparatus for mounting a data storage device 800 (shown in FIGS. 3 and 4) is provided. The data storage device 800 defines a plurality of screw holes 802 in opposite sidewalls 801 of the data storage device 800. The mounting apparatus includes a bracket 10, a resilient member 20, a fastener 30, and a holder 40.

The bracket 10 includes a base 11 and a cover 12. The base 11 may be made of electrically conductive materials, and includes a rectangular bottom plate 111, a first side plate 113 and a second side plate 114 respectively perpendicularly extending up from opposite sides of the bottom plate 111, and an end plate 115 perpendicularly extending from a rear end of the bottom plate 111. An opening 100, which is opposite to the end plate 115, is bounded by the bottom plate 111, the first side plate 113, and the second side plate 114. Two fixing plates 117 respectively perpendicularly extend from tops of the first and second side plates 113 and 113, towards each other. A fixing plate 119 perpendicularly extends from a top of the end plate 115 towards the opening 100. A plurality of fixing posts 1179 is formed on the fixing plates 117 and 119. The first side plate 113 forms two fixing posts 1131 on a middle of the first side plate 113, and defines a through hole 1132 adjacent to the opening 100. The end plate 115 forms a mounting portion 1151 opposite to the opening 100. A fastening post 1152 extends from the mounting portion 1151. The fastening post 1152 defines a screw hole 1154 therein. The cover defines a plurality of securing holes 121 therein.

In the embodiment, the resilient member 20 is a coil spring. The resilient member 20 includes a connecting end 22, which is a small loop at a first end of the coil spring.

In the embodiment, the fastener 30 is a screw with a blocking flange 32 formed between the head and a threaded portion of the screw.

The holder 40 includes a resilient arm 50 made of electrically conductive material, an operating member 60, and an abutting member 70. The resilient arm 50 is flake-shaped. The resilient arm 50 forms a connecting portion 53 at a front end of the resilient arm 50 and defines two fixing holes 51 in a rear end of the resilient arm 50. Two notches 52 are respectively defined in opposite sides of the resilient arm 50 adjacent to the connecting portion 53. A positioning hole 54 is defined in the resilient arm 54 adjacent to the notches 52. The operating member 60 includes a side board 63, an operating portion 62 protruding from a first end of a side surface of the side board 63, and two retaining portions 61 protruding from a second end opposite to the first end of the side surface of the side board 63. The operating portion 62 is generally triangular-shaped, and includes a blocking surface 622 facing the retaining portions 61 and substantially perpendicular to the side board 63, and a curved guiding surface 621 opposite to the blocking surface 622. The abutting member 70 is made of electrically conductive material, and includes a connecting bar 75 and an L-shaped abutting bar 72 extending from a bottom end of the connecting bar 75. The connecting bar 75 defines a connecting hole 71 adjacent to a top end of the connecting bar 75. The abutting bar 72 includes a first portion 721 perpendicular to the connecting bar 75 and a second portion 722 parallel to the connecting bar 75. An abutting protrusion 73 is formed on the second portion 722 of the abutting bar 72 and extends away from the connecting bar 75.

Figure 3:
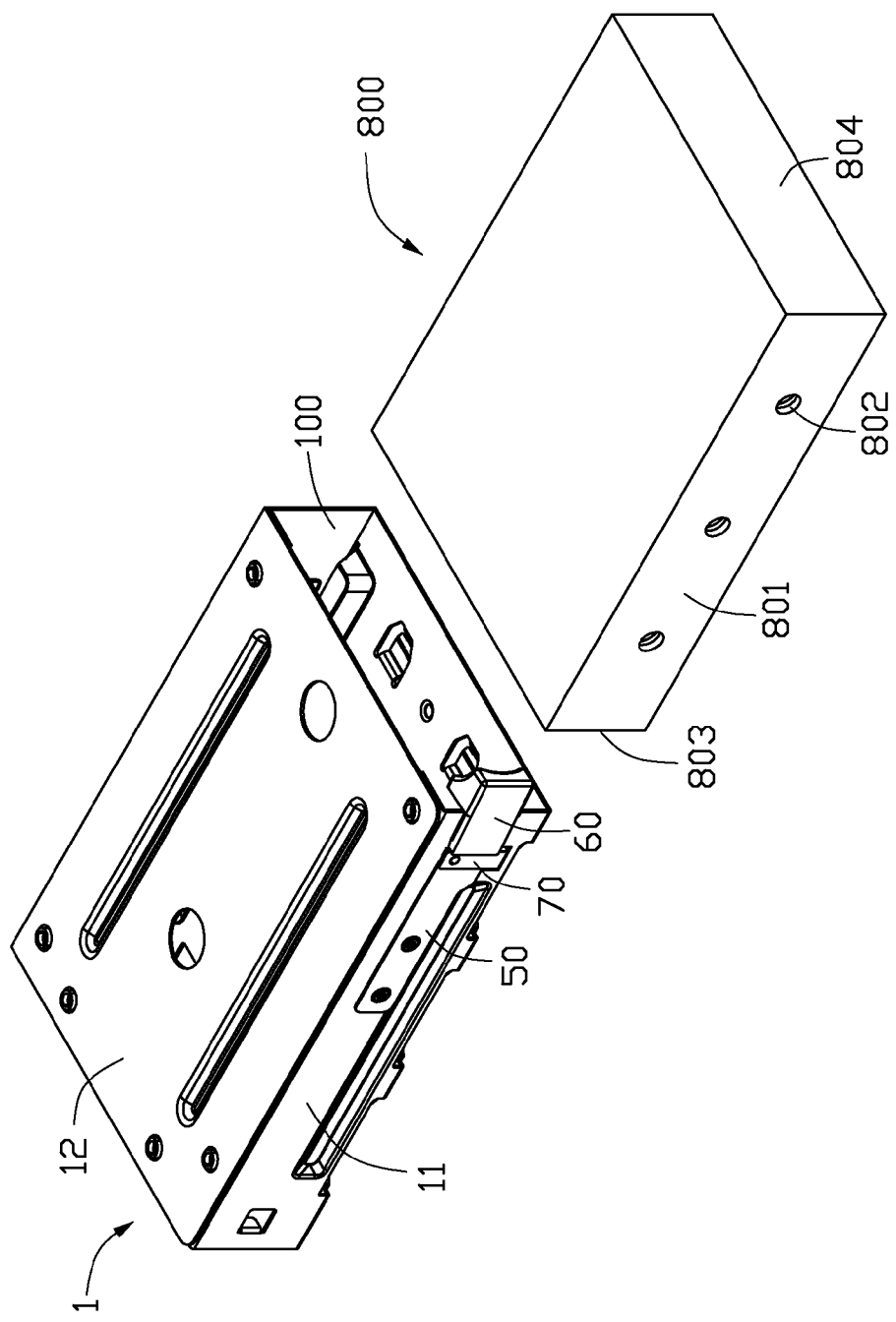
FIG. 3 is an assembled view of the mounting apparatus of FIG. 1, showing a data storage device being detached from the mounting apparatus.

Referring to FIG. 3, in assembly, the fastener 30 is inserted into the resilient member 20 and the threaded portion of the fastener 30 extends out of the connecting end 22 of the resilient member 20. The connecting end 22 is smaller than the flange 32 of the fastener 30, to prevent the flange 32 passing through the connecting end 22, thereby, the fastener 30 is attached to the resilient member 20. The resilient member 20 is inserted into the base 11. The fastener 30 is engaged in the screw hole 1154 of the fastening post 1152 of the end plate 115, to fix the connecting end 22 between the blocking flange 32 of the fastener 30 and the mounting portion 1151 of the end plate 115, thereby, the first end of the resilient member 30 is fixed to the end plate 115 of the base 11 and the second end of the resilient member 30 extends towards the opening 100 of the base 11. The abutting member 70 is fixed to the resilient arm 50, with a rivet secured in the connecting hole 71 of the abutting member 70 and the positioning hole 54 of the resilient arm 50. The operating member 60 is fixed to resilient arm 50, with the retaining portions 61 secured in the corresponding notches 52, thereby, the side board 63 of the operating member 60 abuts against the connecting portion 53 of the resilient arm 50. The resilient arm 50 is attached to an outside surface of the first side plate 113 of the base 11, with the fixing posts 1131 respectively fixed in the corresponding fixing holes 51 of the resilient member 50. Thereby, the operating portion 62 of the operating member 60 extends from the base 11 to the opening 100. The abutting bar 72 of the abutting member 70 extends into the base 11 through the through hole 1132 of the first side plate 113. The cover 12 is attached to a top opposite to the bottom plate 111 of the base 11, with the plurality of fixing posts 1179 of the base 11 respectively fixed in the corresponding securing holes 121 of the cover 12.

Figure 4:
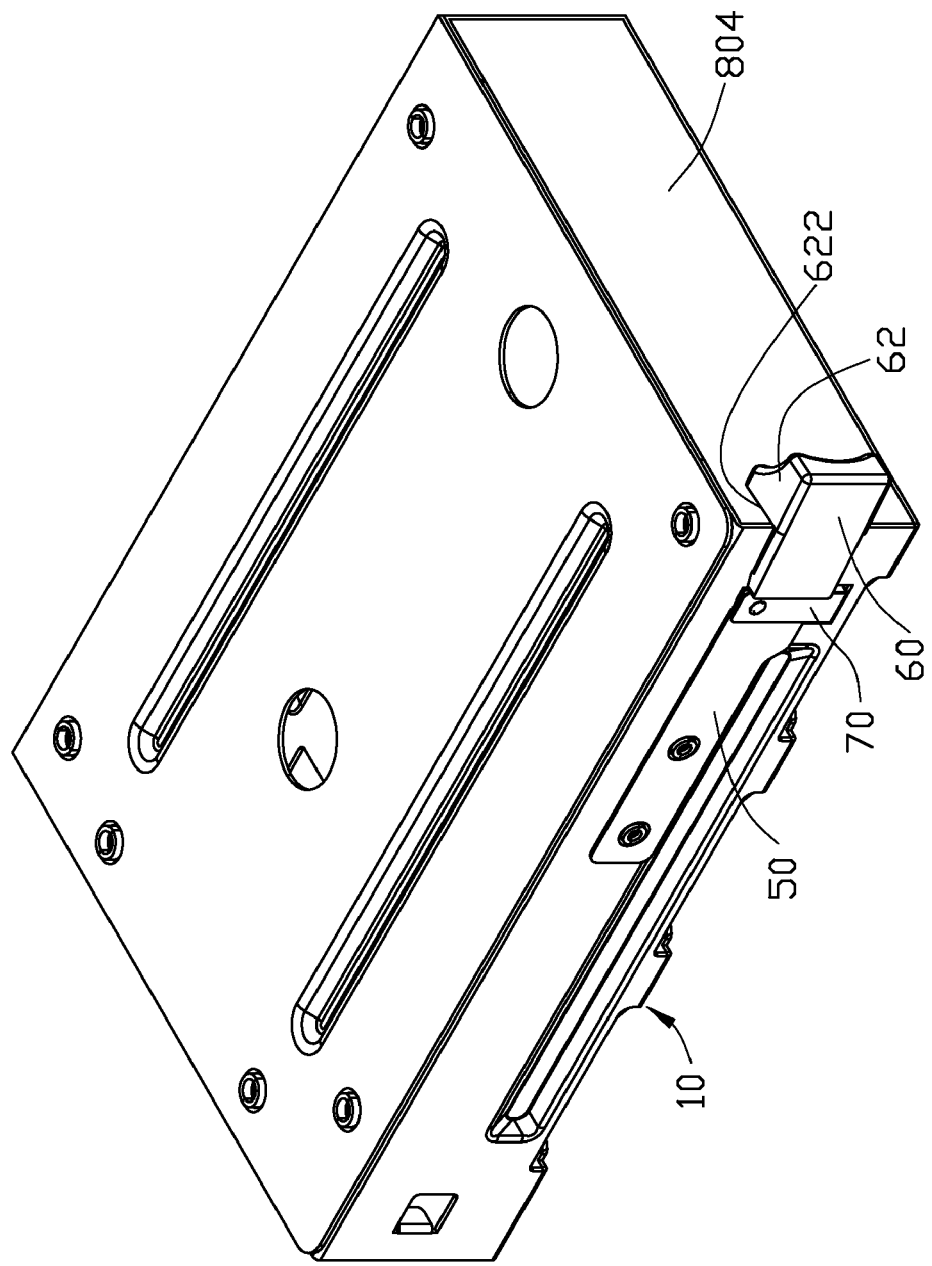
FIG. 4 is an assembled view of the mounting apparatus with the data storage device of FIG. 3 mounted therein.

Referring to FIG. 4, to mount the data storage device 800, the data storage device 800 is slid into the bracket 10 through the opening 100. A rear end 803 of the data storage device 800 abuts against and slides along the guiding surface 621 of the operating portion 62 of the operating member 60, to move the operating member 60 away from the first side plate 113. Accordingly, the resilient arm 50 is deformed away from the first side plate 113. The abutting bar 72 of the abutting member 70 moves out of the through hole 1132 with the operating member 60. When the data storage device 800 enters into the bracket 10, one of the side walls 801 of the data storage device 800 resists against the operating portion 62 of the operating member 60, the resilient arm 50 remains deformed. When the data storage device 800 is fully accommodated in the bracket 10, the rear end 803 of the data storage device 800 resists against the resilient member 20, at the same time, the operating member 60 disengages from the side wall 801 of the data storage device 800. Thereby, the resilient arm 50 restores to move the operating member 60 towards the data storage device 800. The blocking surface 622 of the operating portion 62 of the operating member 60 abuts against a front end 804 opposite to the rear end 803 of the data storage device 800, to prevent the data storage device 800 from moving out of the bracket 10 through the opening 100. Since the resilient arm 50 restores, the abutting bar 72 of the abutting member 70 moves with the resilient arm 50 to extend into the bracket 10 through the through hole 1132 of the base 11, and the abutting protrusion 73 of the abutting bar 72 engages in one of the plurality of screw holes 802 of the data storage device 800. Thereby, the data storage device 800 is electrically connected to the bracket 10 with the abutting member 70 and the resilient arm 50, thereby preventing the data storage device 800 from being destroyed by accumulated static electricity.

To release the data storage device 800, the operating member 60 is moved away from the data storage device 800, the resilient arm 50 is deformed. At the same time, the abutting member 70 moves with the resilient arm 50 and disengages from the screw hole 802 of the data storage device 800. The resilient member 20 restores, thereby pushing the data storage device 800 out of the bracket 10 through the opening 100.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus for mounting a data storage device defining a screw hole in a side of the data storage device, the mounting apparatus comprising:
    a bracket to receive the data storage device, the bracket defining an opening for the data storage device passing therethrough to enter into or retract out of the bracket;
    a holder attached to the bracket and adjacent to the opening;
    wherein the holder is movable between a first position where the holder extends to the opening to block the data storage device, and a second position where the holder departs from the opening to enable the data storage device enter into or retract out of the bracket through the opening;
    wherein the holder comprises a resilient arm and an operating member fixed to the resilient arm, the resilient arm comprises a first end fixed to the bracket, and a second end connected to the operating member, the operating member is biased by the resilient arm to block the opening of the bracket when the holder is in the first position;
    wherein the holder further comprises an abutting member fixed to the resilient arm and adjacent to the operating member, the abutting member extends into the bracket and contacts the data storage device when the holder is in the first position; and
    wherein the abutting member comprises a connecting bar and an abutting bar, the connecting bar comprises a first end fixed to the resilient arm, the abutting bar extends from a second end of the connecting bar and forms an abutting protrusion to engage into the screw hole of the data storage device.

2. The mounting apparatus of claim 1, wherein the operating member forms a blocking surface facing the opening of the bracket in response to the holder at the first position, and a curved guiding surface opposite to the blocking surface, the holder is urged to move towards the second position in response to the data storage device sliding along the guiding surface to enter into the bracket.

3. The mounting apparatus of claim 1, further comprising a resilient member, wherein the bracket comprises an end plate opposite to the opening, the resilient member is attached to the end plate and urges the data storage device towards the opening in response to the data storage device being received in the bracket.

4. The mounting apparatus of claim 3, further comprising a fastener fixing the resilient member to the end plate.

5. The mounting apparatus of claim 3, wherein the resilient member is a coil spring and comprises a connecting end, the fastener is a screw passing through the connecting end and engaging with the bracket to fix the connecting end of the resilient member to the end plate of the bracket.

6. The mounting apparatus of claim 4, wherein a fastening post extends from the end plate and defines a screw hole, the fastener is engaged in the screw hole of the fastening post.

7. An assembly comprising:
    a data storage device comprising two opposite sidewalls, a front end, and a rear end opposite to the front end;
    a bracket to receive the data storage device, and the bracket defining an opening for the data storage device entering into or retracting out of the bracket;
    a holder movably mounted to the bracket and abutting against the front end of the data storage device at the opening, thereby preventing the data storage device from retracting out of bracket through the opening;
    wherein the data storage device is operable to retract out of the bracket in response to the holder disengaging from the data storage device;
    wherein the bracket comprises a base and a cover secured to the base, the base comprises a bottom plate opposite to the cover, a first side plate and a second side plate extending from opposite sides of the bottom plate, and an end plate opposite to the opening;

wherein the holder comprises a resilient arm and an operating member fixed to the resilient arm, the resilient arm is fixed to the first sidewall of the bracket and adjacent to the opening, and the operating member extends to the opening of the bracket to abut against the front end of the data storage device;

wherein the holder further comprises an abutting member fixed to the resilient arm, the base of the bracket, the resilient arm, and the abutting member are made of electrically conductive material, the abutting member extends into the bracket through the first side plate to engage with the data storage device; and wherein the abutting member comprises a connecting bar and an abutting bar, the connecting bar comprises a first end fixed to the resilient arm; the abutting bar extends from a second end of the connecting bar, and forms an abutting protrusion engaging in a screw hole defined in a corresponding sidewall of the data storage device.

8. The assembly of claim 7, further comprising a resilient member attached to the end plate of the bracket, to resist against the rear end of the data storage device in response to the data storage device being received in the bracket.

9. The assembly of claim 8, wherein the resilient member is a coil spring, and comprises a first end fixed to the end plate of the bracket and a second end extending towards the opening to resist against the rear end of the data storage device.

10. The assembly of claim 7, wherein the operating member comprises a blocking surface facing the opening and a curved guiding surface opposite to the blocking surface; the operating member is urged to move away from the opening in response to the data storage device sliding along the guiding surface with the rear end to enter into the bracket; and the blocking surface abuts against the front end of the data storage device in response to the data storage device being received in the bracket.

* * * * *